UNITED STATES PATENT OFFICE.

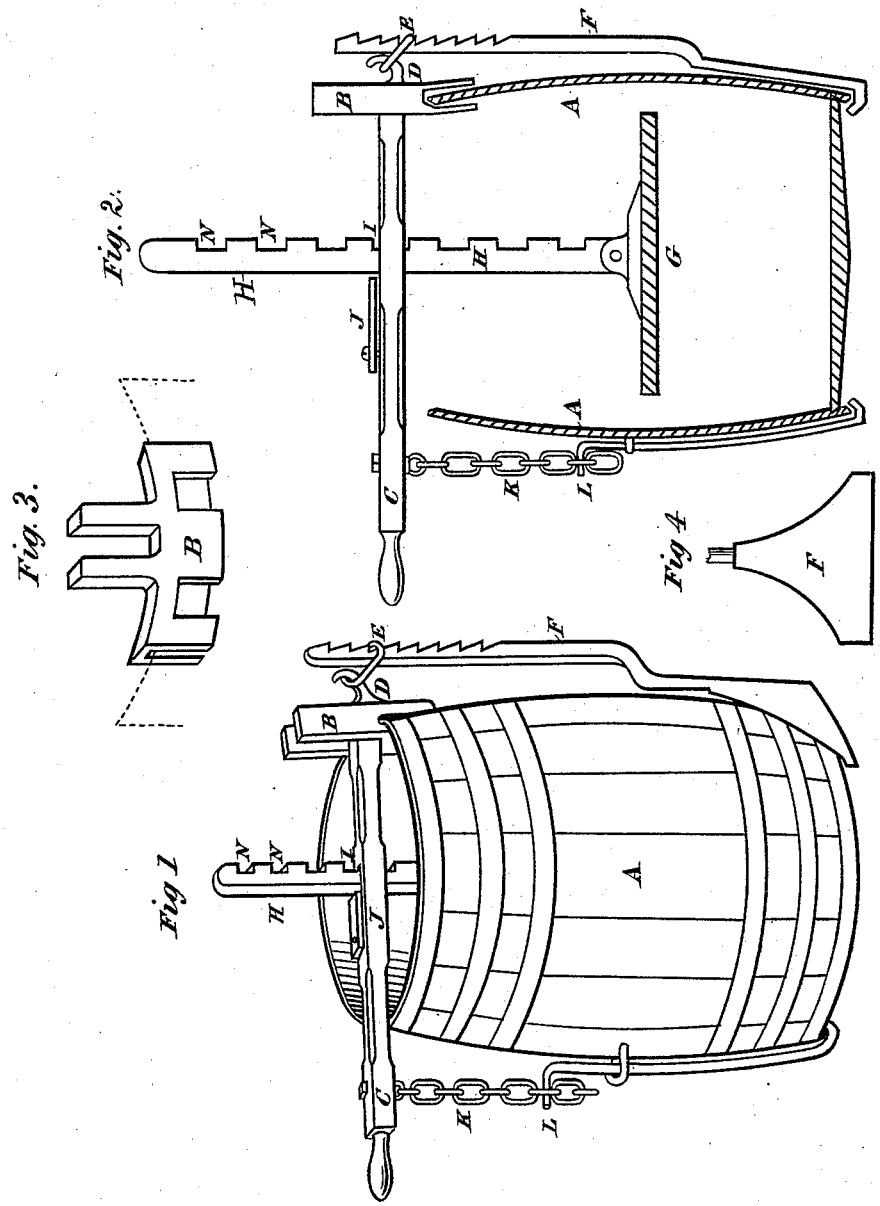

AUGUST SCHEFFEL, OF LOUISVILLE, KENTUCKY, ASSIGNOR OF ONE-HALF TO HUGH T. COSGROVE, OF SAME PLACE.

LEVER-PRESS.

SPECIFICATION forming part of Letters Patent No. 306,112, dated October 7, 1884.

Application filed May 13, 1884. (No model.)

*To all whom it may concern:*

Be it known that I, AUGUST SCHEFFEL, a citizen of the United States, residing at Louisville, in the county of Jefferson and State of Kentucky, have invented a certain new and useful Improvement in Lever-Presssure for Kraut-Barrels; and I do hereby declare that the following is a full, clear, and exact description of the construction and operation of the same, reference being had to the accompanying drawings, forming part of this specification.

This my invention relates to a certain new and useful improvement in a series of devices constituting a lever-pressure for sauer-kraut barrels, consisting in a barrel having a pressure-head working up and down loosely on the inside with a vertical bar hinged thereto in the center extending above the barrel, and up through a slot in the pressure-lever, which extends across the top of the barrel, with a series of notches in the edge of the bar to catch in the opening of the pressure-lever, for the purpose of changing the length as the material is removed from under the head. This pressure-lever is made to rest upon a bearing secured on the edge of the barrel, having tines at the sides to keep it in place, which extends above the lever sufficient to allow for changes in the height when necessary. The pressure-lever is further provided with a hook on the end having a link hinged therein, which engages with the ratchet-bar at the side of the barrel, the lower end of which is widened and hooks under the bottom, so as to be easily changed from one barrel to another, and when pressure is brought upon the lever it is held down by a chain secured to the under side, which drops over a hook at the side of the barrel, and also hooks over the bottom, susceptible of being changed from one barrel to another.

The object of this my invention is to provide a cheap and simple device for pressing sauer-kraut in the barrel, in order to obviate the necessity of removing the weight I heretofore used for the same purpose, which caused much loss of time and labor in taking kraut from the barrel when wanted for ordinary family use. I attain the above object by the mechanism illustrated in the drawings, in which—

Figure 1 is a perspective view of the barrel, showing the lever devices and their several connections with the barrel. Fig. 2 is a sectional elevation of the barrel, showing the pressure-lever and other devices connected therewith. Fig. 3 is a perspective view of the lever-guide, showing its form more fully. Fig. 4 is a flat view of part of the lower end of the ratchet-bar, showing its form.

Similar letters refer to similar parts throughout the several views.

In the drawings, A represents the barrel, which may be made in any of the known forms.

B is the guide-rest for the lever, which is made in form as shown in the drawings, and is slipped over the edge of the barrel loosely, but is tightened by means of the taper when pressed down.

C is the pressure-lever, which extends across the barrel, with the ends resting between the guides of the rest B, having a hook, D, thereon, in which a link, E, is hinged and through which the ratchet-bar F passes, engaging therewith, but is susceptible of being changed from one notch to another in adjusting the height of the lever. This ratchet-bar F is made in form as shown, but is widened where it hooks over the bottom.

G is the pressure-head, which is hinged loosely to the bar H, which extends up through a mortise, I, in the lever C, which answers as a catch for the bar, which has a series of notches, N N, in the edge for the purpose of changing the length, and when set is held in its place by a button, J, hinged to the lever C at the back of the bar H, and when in use the lever C is held down by means of a chain, K, secured to the lever by simply passing the link over the hook L at the side of the barrel; but when necessary the several devices can be so arranged as to suit any required height of kraut in the barrel. There- fore

What I claim as my my invention, and desire to secure by Letters Patent in lever-pressure devices for kraut-barrels, is—

The guide-rest B and pressure-lever C, having button J, catch-mortise I, hook D, link E, ratchet-bar F, chain K, and hook L, as above described, combined with the pressure-head G and bar H, having notches N N, and barrel A, substantially as described, and for the purpose set forth.

AUGUST SCHEFFEL.

Witnesses:
FRANK PARDON,
GEORGE HAMMER.